Patented Oct. 30, 1945

2,387,834

UNITED STATES PATENT OFFICE 2,387,834

RUBBER ACCELERATOR

Arnold R. Davis, Riverside, Conn., assignor to American Cyanamid Company, New York, N. Y., a corporation of Maine No Drawing. Application August 19, 1942,
Serial No. 455,362

10 Claims. (Cl. 260—785)

The present invention relates to new condensation products useful in the vulcanization of rubber and rubber-like materials. More particularly, the invention relates to rubber vulcanization accelerators obtained by reacting cyanamide, formaldehyde and mercaptoarylthiazoles.

As exemplary, condensation products are obtained by reacting mixtures containing formaldehyde, mercaptobenzothiazole and cyanamide, or by reacting formaldehyde with mercaptobenzothiazole to prepare methylolmercaptobenzothiazole which is then reacted with cyanamide.

The following examples, in which parts are given by weight, are illustrative of the invention without restricting the scope thereof.

Example 1

A mixture was made of 10 parts of methylolmercaptobenzothiazole (0.05 mol), 1.0 part of cyanamide (0.025 mol) and 2.9 parts of cyanamide dihydrochloride (0.025 mol). The solids were heated with stirring on a water bath at 95° C. The mixture softened and fused to a semi-liquid, which reacted suddenly with frothing and the evolution of formaldehyde and hydrogen chloride. The resulting resin was heated at 100° C. for two hours in an oven with further evolution of the gases. A Beilstein test of the product indicated the presence of chloride, and the resin was, therefore, crushed, extracted thrice with boiling water and twice by crushing in dilute ammonium hydroxide. The yield was 5.5 parts of a light yellow solid containing a trace of halogen, and softening at 110° C. This product contained about 74% combined mercaptobenzothiazole. The ratio of nitrogen to sulfur atoms was about 1 to 1, based on the analysis of the product which showed 15.05% nitrogen and 28.11% sulfur.

The cyanamide dihydrochloride may be prepared by passing dry hydrogen chloride into cool ethyl alcohol until a 41.5% solution is obtained. A second solution of 50 parts of cyanamide (85%) (1 mol) dissolved in 50 parts of ethyl alcohol was added dropwise, with stirring, to 200 parts of the alcoholic hydrogen chloride. The temperature was maintained below 40° C. At the completion of the reaction, the mixture was cooled to 10° C., filtered, and the precipitate washed with 100 parts of dry ether. It was dried at 50° C. for one hour and stored in a vacuum disiccator over concentrated sulfuric acid overnight. A yield of 105 parts, or 91% of the theoretical, was obtained.

The methylol mercaptobenzothiazole may be prepared as follows: A mixture of 501 parts of 2-mercaptobenzothiazole (3 mols) and a solution of 128 parts of 95% sodium hydroxide (3 mols) in 1500 parts of water was stirred for 30 minutes and the small amount of insoluble material present was removed by filtration. This solution was mixed with 489 parts of 37% aqueous formaldehyde (4.5 mols). This mixture was heated to 50° C. and stirred during the 45-minute addition of 354 parts (3.5 mols) of concentrated hydrochloric acid (sp. gr. 1.18). The temperature rose to 60° C. The mixture was cooled to 30° C. and the granular precipitate was collected on a Buchner funnel. After washing with water, the precipitate was dried overnight in an oven at 50° C. A 97% yield, or 570 parts of a product which melted at 126°–128° C. was obtained.

Example 2

A mixture of 30 parts of methylol mercaptobenzothiazole, as prepared in Example 1, (0.15 mol) and 6.8 parts of cyanamide (0.15 mol) (92.5%) was well ground in a mortar. The mixture was heated at 98° C. in a water bath until it became plastic and fused, with sudden frothing and the evolution of formaldehyde. It was then placed in an oven at 100° C. for three hours and the resulting resin was cooled and crushed. The yield was 33 parts of clear brown resin. A sample of the product was analyzed and found to contain 19.47% nitrogen and 28.29% sulfur, as compared with theoretical yields of 19.03% and 28.95%, respectively.

Example 3

The following materials were placed in a suitable container and heated in a water bath:

| | Parts |
|---|---|
| Methylolmercaptobenzothiazole (0.2 mol) | 39.4 |
| Cyanamide (90%) (0.2 mol) | 9.3 |

At 80° C. the mixture had fused into a homogeneous mass which was then stirred well. The temperature rose spontaneously to 130° C. with the evolution of a gas which may have been water or formaldehyde. The product was cooled, powdered to pass through a 20-mesh screen and stirred for half an hour with 100 parts of 5 N ammonium hydroxide. It was filtered, washed well with water and dried in an oven at 60° C. Twenty-two parts of a resinous product were obtained. The ammonia solution was acidified and 11 parts of mercaptobenzothiazole were recovered. Analysis of the product indicated that it contained 57% combined mercaptobenzothiazole, and a ratio of nitrogen to sulfur atoms of about 2 to 1, as based on a content of 22.68% nitrogen and 22.84% sulfur.

Example 4

A mixture of 39.4 parts of methylolmercaptobenzothiazole (0.2 mol) and 4.6 parts of 90% cyanamide (0.1 mol) was heated in a suitable container with continuous stirring. The rate of heating was so adjusted that 130° C. was reached in half an hour. Above 100° C. there was some frothing but no exothermic reaction. The melt was cooled, powdered to 40-mesh and leached for five minutes with 100 parts of 5 N ammonium hydroxide. It was filtered, washed with 200 parts of acetone and dried in an oven at 60° C. Twelve parts of resinous product was obtained. The analysis indicated that this material contained 63% combined mercaptobenzothiazole and contained nitrogen and sulfur atoms in the ratio of about 2 to 1, based on a content of 23.93% nitrogen and 24.19% sulfur. Acidification of the ammonia solution precipitated 16 parts of mercaptobenzothiazole.

So far as the present invention is concerned, it appears to be wholly optional whether the methylol derivative of the mercaptoarylthiazole is first prepared and then admixed with cyanamide, as in the preceding examples, or whether the cyanamide, the mercaptoarylthiazole and a formaldehyde polymer such as paraformaldehyde or trioxymethylene are mixed and both reactions carried out together as in the following examples. In the latter case the use of the solid polymers is preferable since they are convenient to handle.

Example 5

The following materials were mixed dry, heated and stirred in a suitable container immersed in a water bath:

|  | Parts |
|---|---|
| Mercaptobenzothiazole (0.2 mol) | 33.4 |
| Cyanamide (0.2 mol) | 8.4 |
| Trioxymethylene (0.067 mol) | 6.0 |

At 80° C. the mixture fused to a homogeneous mass and an exothermic reaction took place. The temperature rose to 125° C., where it remained for five minutes. The reaction mixture was cooled, powdered to 40-mesh and leached with 100 parts of 5 N ammonium hydroxide. It was filtered and washed with 200 parts of acetone. After drying at 60° C., 23 parts of resinous product were obtained. The acetone was evaporated to dryness, leaving nine parts of a dry powder. The analysis of these two products showed the main one to contain 58% mercaptobenzothiazole and have nitrogen and sulfur atoms in the ratio of 2 to 1, as based on a content of 22.35% nitrogen and 22.58% sulfur. The acetone-soluble dry powder was 83% mercaptobenzothiazole and had a ratio of nitrogen to sulfur atoms of 1 to 1, as based on a content of 13.08% nitrogen and 31.69% sulfur. Acidification of the ammonia extract precipitated 14 parts of mercaptobenzothiazole.

Example 6

This preparation was generally similar to that used in Example 5 except that the mercaptobenzothiazole was pre-heated prior to the addition of the cyanamide and trioxymethylene. The following materials were used:

|  | Parts |
|---|---|
| Mercaptobenzothiazole (0.2 mol) | 33.4 |
| Cyanamide 90% (0.22 mol) | 10 |
| Trioxymethylene (0.09 mol) | 8 |

The mercaptobenzothiazole was heated to 80° C. in a suitable container. A mixture of the cyanamide and the trioxymethylene was then added with stirring. The temperature dropped slightly but was quickly returned to 80° C., at which point an exothermic reaction started and the temperature rose to 145° C. The mixture was cooled, powdered to 40-mesh and leached with 100 parts of 5 N ammonium hydroxide. It was filtered, washed with water and dried at 60° C. A yield of 42 parts of a resinous product was obtained. The analysis showed that the product contained 63% combined mercaptobenzothiazole and had a ratio of nitrogen to sulfur atoms of about 2 to 1, based on a content of 22.77% nitrogen and 23.97% sulfur. Acidification of the ammonia solution precipitated nine parts of mercaptobenzothiazole.

Similarly, other mercaptoarylthiazoles may be used in place of the mercaptobenzothiazole. Illustrative of these compounds are 2-mercapto 6-nitrobenzothiazole; 2-mercapto 6-ethoxybenzothiazole; 2-mercapto 5-nitro 6-chlorobenzothiazole; 2-mercapto 5-chlorobenzothiazole; 6-methylbenzothiazole; 1-mercapto 6-methoxybenzothiazole; 2-mercaptonaphthothiazole; and other similarly substituted mercaptobenzo and naphthothiazoles.

The products obtained as described were incorporated in the usual manner into a rubber stock comprising:

|  | Parts by weight |
|---|---|
| Smoked sheets | 100 |
| Zinc oxide | 6 |
| Sulfur | 3 |
| Stearic acid | 1 |
| Accelerator | 1 |

The rubber stocks so obtained were vulcanized by heating for different periods of time at a temperature of 141° C.

| Accelerator as prepared in— | Tensile strength lbs./sq. inch 30 min. cure at 141° C. |
|---|---|
| Example #1 | 3,170 |
| Example #2 | 3,020 |
| Example #3 | 2,810 |
| Example #4 | 3,210 |
| Example #5 | 2,215 |
| Example #6 | 2,080 |

The data set forth above show that the new class of compounds possess desirable accelerating properties. Moreover, the uncured stocks prepared as above, showed very little set-up or prevulcanization as determined by the Williams plastometer described by Williams in Industrial and Engineering Chemistry for 1924 (16, p. 362; see also Krall, ibid., 16, p. 922) on heating in water at 85° C. for two hours.

While the preferred class of materials may be employed alone as accelerators, their action may be markedly increased by employing therewith organic nitrogen-containing accelerators as activators, such as diphenyl-guanidine, diorthotolylguanidine, the addition product of diorthotolylguanidine and zinc chloride, Shiff's bases, hexamethylene tetramine, etc.

From the above examples, it appears that new condensation products are obtained by reacting molecular proportions of the components as indicated. However, it will be understood that in carrying out the condensation an excess of one or more of the interacting substances may be employed in any way suggested by general practice in synthetic organic chemistry. Accordingly, I do not confine myself to the specific proportions disclosed.

While I have disclosed certain specific processes employing certain specific substances in definite proportions or amounts, it is to be understood that many changes and modifications of these features will readily appear to those skilled in the art, without departing from the spirit of my invention. Accordingly, my invention is to be limited only by the appended claims, construed as broadly as is permissible in view of the prior art.

I claim:

1. The process which comprises vulcanizing rubber in the presence of sulfur and the condensation product obtained by fusing a mercaptoarylthiazole, cyanamide and a formaldehyde polymer, the mercaptoarylthiazole and the cyanamide being present in substantially equimolecular proportions.

2. A process according to claim 1 in which the mercaptoarylthiazole is mercaptobenzothiazole.

3. The process which comprises vulcanizing rubber in the presence of sulfur and the condensation product obtained by fusing substantially equimolecular proportions of a methylol mercaptoarylthiazole and cyanamide.

4. A process according to claim 3 in which the mercaptoarylthiazole is mercaptobenzothiazole.

5. A vulcanizable rubber composition comprising unvulcanized rubber, sulfur and the condensation product of a mercaptoarylthiazole, cyanamide and formaldehyde, the mercaptoarylthiazole being present in substantially equimolecular proportions.

6. A composition according to claim 5 in which the mercaptoarylthiazole is mercaptobenzothiazole.

7. A vulcanizable rubber composition comprising unvulcanized rubber, sulfur and the condensation product obtained by fusing substantially equimolecular proportions of a methylol mercaptoarylthiazole and cyanamide.

8. A composition according to claim 7 in which the mercaptoarylthiazole is mercaptobenzothiazole.

9. A vulcanizate obtained by vulcanizing a composition comprising unvulcanized rubber, sulfur and the condensation product obtained by fusing a mercaptoarylthiazole, cyanamide and formaldehyde, the mercaptoarylthiazole and cyanamide being in substantially equimolecular proportions.

10. A vulcanizate obtained by vulcanizing a composition comprising unvulcanized rubber, sulfur and the condensation product obtained by fusing substantially equimolecular proportions of methylol mercaptoarylthiazole and cyanamide.

ARNOLD R. DAVIS.